March 24, 1959 P. FREEN 2,879,382
FIELD STRENGTH METER
Filed April 28, 1954 2 Sheets-Sheet 1
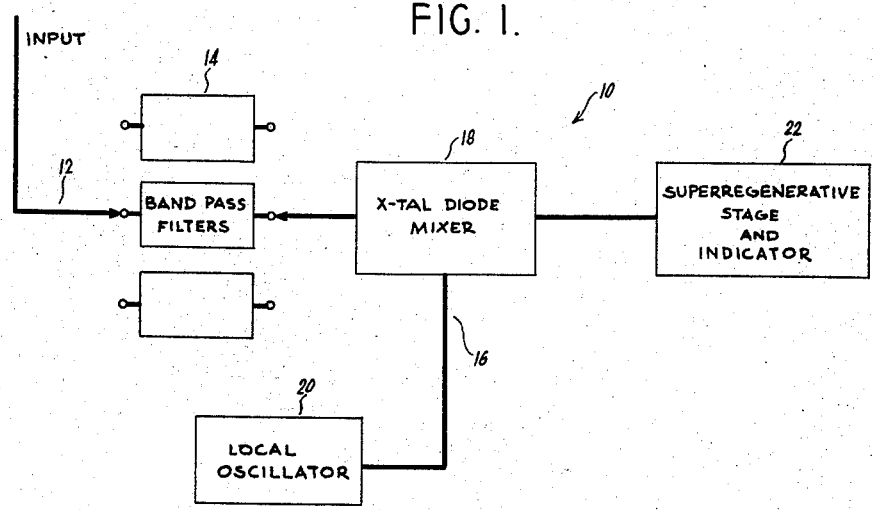
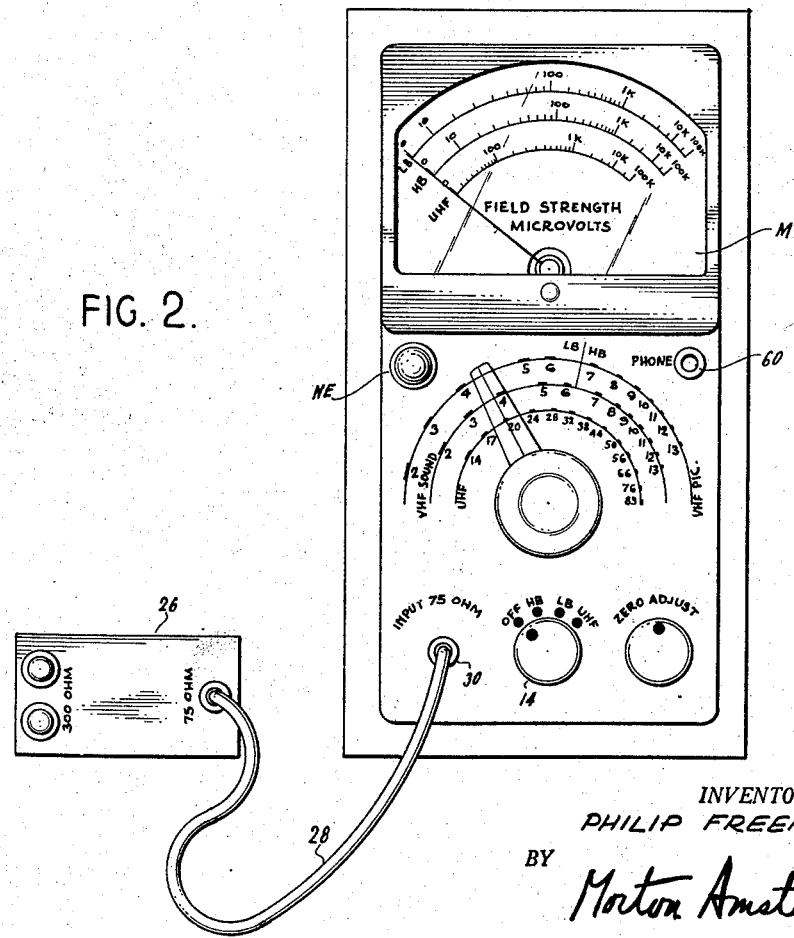
INVENTOR.
PHILIP FREEN
BY Morton Amster
ATTORNEY March 24, 1959 — P. FREEN — 2,879,382
FIELD STRENGTH METER
Filed April 28, 1954 — 2 Sheets-Sheet 2

INVENTOR.
PHILIP FREEN
BY Morton Amster
ATTORNEY

United States Patent Office 2,879,382
Patented Mar. 24, 1959

2,879,382

FIELD STRENGTH METER

Philip Freen, Lorne Park, Ontario, Canada

Application April 28, 1954, Serial No. 426,233

20 Claims. (Cl. 250—2)

The present invention relates to measuring apparatus, and in particular to field strength or intensity meters for measuring radio frequency energy. Advantageously in accordance with the present invention relatively accurate field strength measurements may be made over a wide range of frequencies.

In adjusting directional antenna, particularly for television and like installations, it is necessary to accurately measure the signal strength in orienting the antenna for optimum reception and performance. A number of meters are presently available for making such measurements but have not found wide acceptance. Among the disadvantages of known meters is their instability in operation, inability to handle a relatively broad band of frequencies, optimally all of the television bands, bulkiness, and their requirement of relatively high-power supplies.

It is broadly an object of the present invention to provide a novel field strength meter which obviates one or more of the aforesaid difficulties. Specifically, it is within the contemplation of the invention to provide a field strength meter which from both the standpoint of construction and operation, is highly suitable for measuring the signal of all of the assigned television bands.

Among the known field strength measuring instruments is a conventional radio receiver in which the intermediate frequency signal is converted by a rectifier to a steady direct current which in turn operates a moving-coil type indicating meter. Sensitivity control over the instrument for measurement of large radio frequency voltages is usually attained by reducing the amplification of one or more of the receiver stages, as by varying grid bias of said receiver stages. Such instruments have been found rather inaccurate and need bulky power supply due to the fairly large number of tubes. Additionally, these instruments usually employ a separate hand-calibrated scale in the indicating meter for each frequency band since the overall sensitivity varies as the instrument is switched from one frequency band to another. It will be appreciated that this expedient increases construction costs and requires careful adjustment when the instrument is switched in use. Further, in view of the number of tubes needed in the stages of radio frequency and intermediate frequency amplification to obtain the required sensitivity, the risk of uncontrolled changes in sensitivity and accuracy is greatly increased. The greater the number of tubes, the greater the variations introduced by ageing of the individual tubes. Still further, the suggested approach for sensitivity control of the instrument presents a further source of inaccuracy, since biasing voltage changes for a tube will not have the same effect as the tube ages. The mentioned drawbacks become more pronounced when it is appreciated that field strength measurements must be made of rather small values of signal, and frequently are made at difficult to reach locations where a light-weight and portable structure is to great advantage. Further, at the locations where measurements are made it is frequently impossible to make hand adjustment of the meter when switching from one frequency band to another. Although more complicated instruments, resorting to reference voltages for standardization and precisely constructed circuit components overcome some of these problems, it will be understood that the use of such expedients involves rather complex instrumentalities and attendant cost increases.

Accordingly, it is a further object of the present invention to provide a highly accurate and reliable field strength meter which is inherently simple in construction and may be used for field measurements at actual installations without the need for on the spot adjustments.

It is a still further object of the present invention to provide a field strength measuring device in which the sensitivity of the metering circuit may be decreased in accurately reproducable amounts, and independent of the characteristics of circuit components.

It is a still further object of the present invention to provide a field strength meter which assures reliability and precision in making measurements, yet employs a relatively simple circuit adapted for assembly as a lightweight, compact and portable unit.

In accordance with an illustrative embodiment demonstrating features of the present invention, a field strength meter is provided which in the preferred form embodies a single vacuum tube serving in both a superregenerative amplifying circuit and a tunable oscillator circuit. The vacuum tube circuit is arranged in combination with an indicating meter such that the sensitivity of the amplifying circuit can be standardized and adjusted regardless of tube ageing. To advantage, the superregenerative circuit is operated in the logarithmic mode so that the indicating meter covers an extremely wide range of signal values, without the need for switching, variable bias controls and like troublesome expedients. To further advantage, the use of a single tube permits battery operation, and as such the field strength meter may be constructed as a portable and compact unit.

The above and still further objects, features and advantages of the present invention, will be best appreciated upon reference to the following detailed description of a presently preferred embodiment, when taken in conjunction with the accompanying drawing, wherein:

Fig. 1 is a block diagram of an illustrative field strength meter embodying features of the present invention;

Fig. 2 is an elevational view showing the details of the front panel of the illustrative field strength meters.

Figure 3:
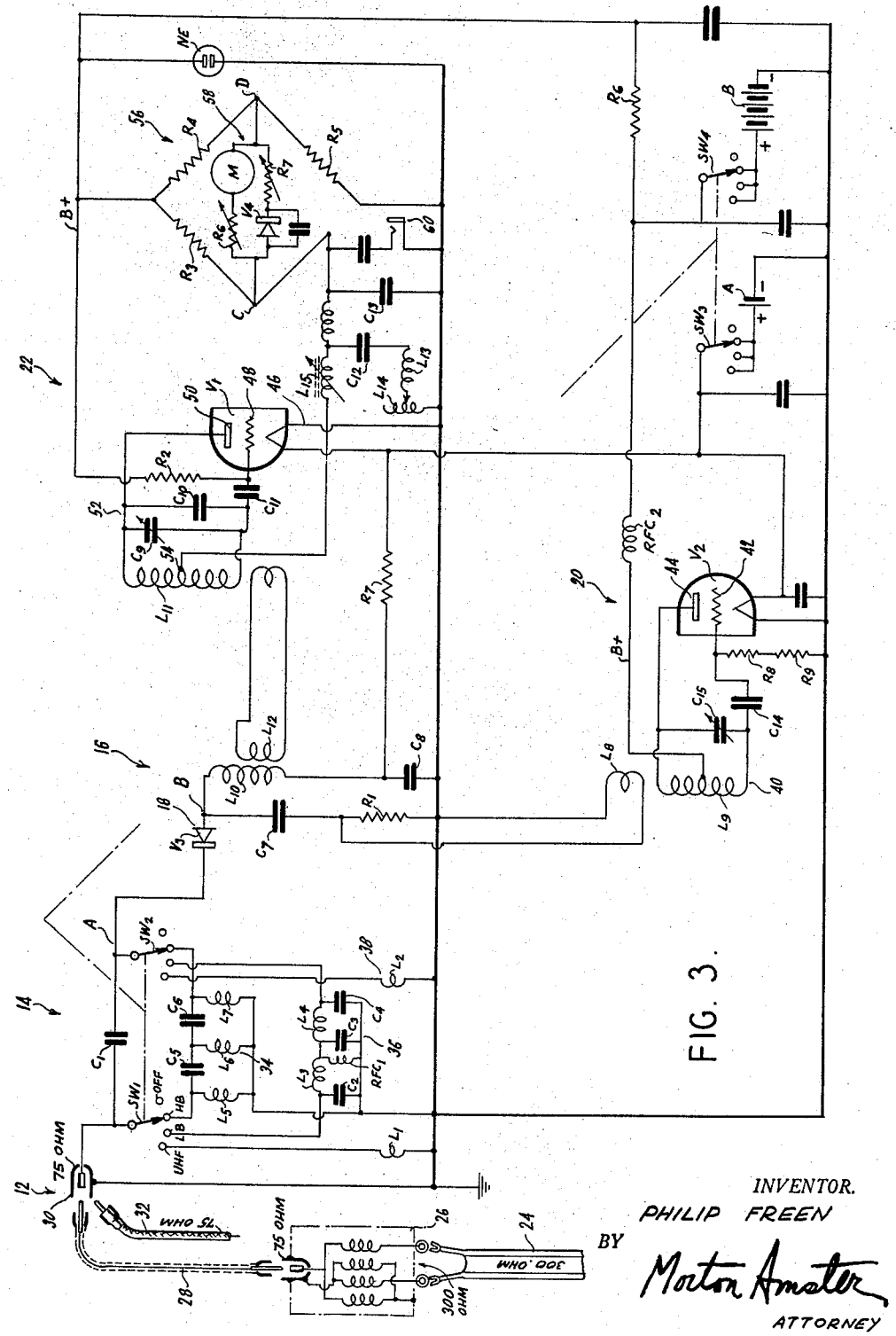
Fig. 3 is a schematic diagram showing the details of the circuit diagrammatically illustrated in Fig. 1.

Brief reference will be made to Fig. 1 wherein there is shown the block diagram of an illustrative field strength meter 10 which includes a signal input stage 12, a preselector stage 14, a heterodyne converter stage 16 embodying a crystal mixer 18 and a local oscillator 20, and a superregenerative amplifying stage and indicator 22. Preferably, and as will be appreciated from the detailed description in connection with Fig. 3, a signal dual-type tube is used for the local oscillator tube and the regenerator tube 22, a crystal diode is used as the mixer 18, and fixed filter elements are used in the preselector stage 14.

Referring now specifically to Fig. 3, showing the complete circuit for the field strength meter, 10, the input circuit 12 is seen to be designed for radio frequency voltages available at the ends of correctly terminated transmission lines with surge impedances of either 300 ohms or 75 oms. It will be appreciated that this design is chosen to cover television frequencies in the low, high, and ultra-high frequency bands, respectively from 54 to 88 megacycles, 174 to 216 megacycles and 470 to 890 megacycles. The illustrative input circuit for the 300 ohm line 24 includes a matching transformer 26 coupled via an appropriate length of coaxial cable 28 to the terminal 30. The matching transformer 26 is illustrated as a transmission line transformer coiled up for convenience, placed in a metal case or the like, and provided with suitable input and output terminals. A 75 ohm line, such as 32, may be connected directly to the input terminal 30 since it is properly matched for the same.

The preselector stage 14, deriving its input from the single input terminal 30 includes filters 34, 36, 38, appropriate for the frequency bands to be covered. Specifically, the filter 38 includes inductanes $L_1$, $L_2$ and condenser $C_1$, designed in the illustrative form for the UHF range of 470 to 890 megacycles. The filter 34, which includes inductances $L_5$, $L_6$, $L_7$ and condenser $C_5$, $C_6$, is designed in the illustrative form for the high frequency signal band, ranging from 174 to 216 megacycles. The filter 36 including the inductances $L_3$, $L_4$ and the condensers $C_2$, $C_3$, $C_4$ and the radio frequency choke $RFC_1$ is designed for the low frequency signal band of 54 to 88 megacycles.

Band selection is obtained by ganged switches $SW_1$, $SW_2$, the switch $SW_1$ connecting the input terminal 30 to the appropriate one of the filters 34, 36, 38 and the switch $SW_2$ connecting the output of the selected filter to the output line or terminal A. With the ganged switches in the position illustrated in Fig. 3, the high-band filter 34 is in circuit with the input line 30 and the output terminal A and the signals applied to the output terminal A will be from approximately 160 megacycles up, with signals of lower frequencies greatly attenuated. Upon turning of the ganged switches one position to the left in the clockwise direction, the low band filter 36 is inserted and the output at terminal A will consist of all signals from approximately 160 megacycles down, with signals at higher frequencies greatly attenuated. Upon further switching to the next position in the clockwise direction, the ultra-high band filter 30 is in circuit and the output at terminal A will consist of signals in excess of 470 megacycles, with signals at lesser frequencies greatly attenuated. The use of fixed tune filter components in the preselection circuit or stage 14 assures a more constant input impedance and as such contributes to reliability of the meter.

The heterodyne converter 16 is illustrated as including a diode crystal mixer $V_3$ and an oscillator tube $V_2$ shown as a half triode section. The crystal diode mixer $V_3$, of well known form, derives signals at the preselected frequency ranges from the line A, and is inductively coupled to the high frequency oscillator 20 via the inductive tap $L_8$ and a short length of transmission line terminated by resistor $R_1$. The oscillator 20, likewise of well known construction, is capacitatively tuned by condenser $C_{15}$ through a frequency range such that either the fundamental frequency of the oscillator or a selected harmonic may be beat at the diode crystal mixer 18 to produce a single intermediate frequency for the various frequency inputs to the crystal mixer. For the described design of the preselector stage 14, the high frequency oscillator may be tuned through a frequency range of 92 to 188 megacycles, and an intermediate frequency of 40 megacycles established in the output circuit of the crystal mixer 18. If, for example, the ultra-high signal band is to be measured, the fifth harmonic of the variable high-frequency oscillator 20 is used at terminal B of the crystal mixer 18 and tuned 40 megacycles higher in frequency than any other signals in the ultra-high frequency range of 470 to 890 megacycles. Thus, the signal output at point B will be at the intermediate frequency of 40 megacycles and have a magnitude dependent upon the magnitude of the signal input to the mixer 18. If the high-band signal band is to be measured, the fundamental of the variable high frequency oscillator 20 is used and tuned 40 megacycles lower in frequency than the signal frequency to be measured, which falls within the range of 136 to 176 megacycles. If the low-band signal band is to be measured, the fundamental frequency of the variable high frequency oscillator 20 is tuned 40 megacycles higher than the low frequency signal to be measured, which falls within the range of 94 to 128 megacycles. It can be thus appreciated that the television signals for all of the bands can be beat or heterodyned with the signal generated by the high frequency oscillator 20 and produce an intermediate frequency signal having a magnitude dependent upon input signal strength. The oscillator 20, which operates by well understood principles, includes a capacitatively-tunable tank circuit 40 composed of inductance $L_9$ and tunable condenser $C_{15}$. The tank circuit 40 is coupled at one side via condenser $C_{14}$ to the grid 42 of the oscillator tube $V_2$. The other side of the tank circuit 40 is connected to the plate 44 of the tube $V_2$. Appropriate resistors $R_8$, $R_9$ are connected in the grid circuit of the oscillator, while the source of energizing potential, indicated as B+, is center tapped to the inductance $L_9$ through a radio frequency choke $RFC_2$ from the B battery. The use of a single oscillator 20 is advantageous in that all of the frequency bands may be covered without switching of the local oscillator components, and by merely tuning of condenser $C_{15}$. Since local oscillator components as well as the oscillator design are frequency critical, the elimination of switches precludes introduction of random capacitances, especially at high frequencies.

The heterodyned output of the crystal mixer stage 18, is inductively coupled via the transformer $L_{10}$, $L_{12}$ and a short length of transmission line to the input of the superregenerative amplifier and indicating stage 22. The coupling circuit is designed to take into account the changes in crystal impedance with variations of the applied local oscillator radio frequency signal. Normally, the crystal impedance will vary with the tuning of the local oscillator 20 and the load appearing across $L_{11}$, which is the input circuit to the intermediate frequency superregenerative stage 22, will change to cause undesirable variations in the output circuit. To minimize this source of error, inductance $L_{10}$ is tuned by condensers $C_7$ and $C_8$ in series to the intermediate frequency. The inductance $L_8$ is a very low impedance at the intermediate frequency. Thus the crystal diode $V_3$ is tapped across the inductance $L_{10}$ by a capacitance tap in the ratio of the impedances of condenser $C_7$ and condenser $C_8$. Condenser $C_7$ is selected to be a very low impedance at frequencies of from approximately 50 megacycles up, while the inductance $L_{10}$ is selected as a high impedance at frequencies of from approximately 50 megacycles up. However, condenser $C_7$ is of a relatively low impedance value at the intermediate frequency, and therefore, impedance variations of the crystal mixer will only have a small effect since the crystal mixer is connected directly across condenser $C_7$. Further, the use of link coupling between the output of the mixer 18 and the input to the amplifier stage 22 further reduces the effect of impedance variation due to the crystal diode $V_3$. Capacitative changes of the crystal impedance will be greatly reduced in that the capacitative coupling between inductances $L_{12}$ and $L_{11}$ is exceptionally small.

The amplifying and indicating stage 22 includes a regenerator tube $V_1$ having a filament 46, a control electrode 48, a plate electrode 50 and a regenerative circuit 52. The regenerative circuit 52, the tube $V_1$, and the associated components, provide a superregenerative amplifier of the well known self-quenching type, operating in the logarithmic mode. Briefly, for amplifier operation in the self-quenching logarithmic mode, circuit conditions are chosen such that oscillations are able to build up to an equilibrium value before self-quenching. In the absence of a signal, thermal-agitation noises to the input circuit of the regenerator tube $V_1$ produce the initiating voltage which starts the build-up process. However, when there is an incoming signal larger than thermal-agitation voltages, the incoming signal initiates the build-up period and causes the equilibrium or maximum value of the oscillations to be reached sooner. Although this has the effect of advancing the starting of the oscillations, as is well understood, the plate current of the tube $V_1$ decreases as a logarithmic function of the applied incoming signal. The regenerator tube $V_1$ in combination with the inductance $L_{11}$, tunable condenser $C_9$, fixed condenser $C_{10}$ and the tube interelectrode capacities form a tapped-capacitance oscillator circuit of well known function, which is arranged to oscillate at the intermediate frequency. This circuit is arranged to oscillate strongly, such that the grid 48 accumulates a negative charge in an extremely short period of time, of the order of .00001 of a second, to cut off the current flow in the plate circuit of the tube $V_1$. Resistor $R_2$ connected to the energy source and the condenser $C_{11}$ of the regenerative circuit 52 provide a grid leak and timing circuit through which the negative charge accumulating on the grid 48 leaks off. At a point dependent upon the time constant of the circuit $R_2$, $C_{11}$ the plate current of the tube $V_1$ will commence flowing, and the oscillation cycle will repeat. As is well understood for oscillator design, the plate current $V_1$ will depend upon the average strength of radio frequency oscillations generated by the tube. If the average strength of oscillation is large, then the plate current will be small, and conversely, if the average strength is small, the plate current will be large. Accordingly, if the plate current of the tube $V_1$ is adjusted to a definite and selected value, the average strength of oscillations will always be the same. In turn, the plate current is dependent upon the presence or absence of an external signal applied to the input transformer $L_{11}$, which input is dependent upon the strength of the incoming intermediate frequency signal. As previously pointed out, the oscillations generated by the tube $V_1$ in the presence of a signal, applied at input $L_{11}$ will reach the equilibrium point at which the tube's plate current is cut off sooner than with no externally applied signal. The plate current change realized is dependent upon the logarithmic function of the input signal amplitude. With the logarithmic signal output from the regenerator tube $V_1$, a great range of measurements can be accommodated on a properly calibrated scale of the indicating instrument, as shown in Fig. 2.

The strength of the oscillations generated by the regenerator tube $V_1$ is varied to provide a standard or reference plate current with no signal, by control of the efficiency of the center tap 54 on the inductance $L_{11}$ of the regenerator circuit 52. This efficiency is varied by a tunable inductance $L_{15}$ in circuit with a condenser $C_{12}$ and inductances $L_{13}$, $L_{14}$. The inductance $L_{14}$ may be the inductance which is actually controllable and in one form may be a variable resistor of the "volume-control" type with a very low value of resistance, but having sufficient inductance to control the circuit. Inductances $L_{13}$ and $L_{15}$ are provided such that the inductance $L_{14}$ may provide the proper range of inductance values for control. By varying the varying inductance of the tap 54, the efficiency of oscillations of the regenerator tube $V_1$ can be controlled and established at any selected value. For example, if the inductance presented at the tap 54 is comparatively large, offering a high impedance to the intermediate frequency, the only feed back path provided to sustain oscillation is in the tube 50 through the small interelectrode capacity of the tube $V_1$. However, if the inductance $L_{15}$ is very small and offers a low impedance at the intermediate frequency, then a large amount of feed back is available since the filament 46 of the tube $V_1$ is effectively tapped onto the inductance $L_{11}$.

The stage 22 further includes a balancing bridge 56 of the well-known Wheatstone type having resistive balancing arms $R_3$, $R_4$, $R_5$ and including the regenerative circuit $V_1$ as the final balancing arm. The bridge 56 has one pair of opposite terminals connected between the source of energizing potential B+ and ground, and includes a metering circuit 58 across the null points C, D. The metering circuit 58 includes a standard metering device M, such as a moving-coil type meter having a pointer (see Fig. 2), the meter being in series with a variable resistance $R_6$ and shunted by a variable resistance $R_7$ and a series connected crystal diode $V_4$. The crystal diode $V_4$, which may have a germanium semi-conductive body, has the property of varying its internal resistance in accordance with the current flow therethrough. For example, if the current flow through the crystal diode $V_4$ is small its internal resistance is very large. As the current increases through the diode $V_4$, its resistance drops to a lower value. Thus the meter M is effectively shunted by a resistance having a value diminishing as the current to be metered rises. With no external signal applied to the field strength meter 10, the indicating instrument M will read zero, and the shunting crystal diode $V_4$ will have a very high resistance in that there is no voltage across the null points C, D. At a point where the field strength meter has an external signal applied sufficient to deflect the indicating instrument M to approximately half scale, the diode $V_4$ is selected such that its resistance value drops sufficiently to begin shunting the indicating instrument M. The exact point of meter deflection at which the diode starts shunting the indicating instrument M, is determined by the voltage across the null points, C, D which is controlled by resistance $R_6$. The resistance $R_7$ in series with the diode $V_4$ controls the minimum resistance to which the diode $V_4$ and the resistance $R_7$ in series can drop and accordingly the maximum shunting effect. The resistance $R_7$ is adjusted such that readings of the indicating instrument M are accurate at the highest microvolt calibrations of the meter. It will be appreciated that inductance $L_{14}$ controls the accuracy of the instrument M until approximately half scale, and at that time the shunting diode $V_4$ controls the accuracy of the instrument from half scale to full scale. The voltage between the null points C, D depends upon the value of resistance $R_6$ in series with the meter M which voltage is adjustable such that the exact point of meter deflection of which the diode $V_4$ starts to shunt can be controlled.

In addition to the stabilizing circuit described in conjunction with the meter M, further stabilization is provided by connecting a neon tube voltage regulator NE across the power supply such as to stabilize the plate voltage applied to the regenerator tube $V_1$.

Filament and plate voltages to the single tube $V_1$, $V_2$ are derived from the A and B batteries which are appropriately connected by switches $SW_3$ and $SW_4$ which are ganged to each other and with the switches $SW_1$, $SW_2$. When the switches $SW_1$, $SW_2$ are turned from the "off" position to any one of the "on" positions corresponding to band selection, operating potentials are applied to the tube $V_1$, $V_2$.

Shunting the vacuum tube balancing arm of the bridge circuit 56 is a jack 60 for connection of a loud speaker or the like. The sound program of a television channel may be monitored from this source.

For a more thorough understanding of the invention, a typical field measurement will be described in detail:

If, for example, the field strength of television channel "2" were to be measured, operating at a signal frequency of 54 megacycles, the antenna would be appropriately connected by the input circuit 12 to the terminal 30, and the ganged switches SW moved to the terminal marked "LB." In this position the low band pass filter 36 covering the range of 54 to 88 megacycles is connected in circuit with the mixer $V_3$ of the heterodyne converter 16. The local oscillator is tuned by the condenser $C_{15}$ to produce oscillations at a frequency of 94 megacycles such that the required intermediate frequency of 40 megacycles is produced at the output of the mixer circuit 18. The regenerator amplifier stage 22, tuned only to the intermediate frequency, amplifies the signal applied thereto, and causes meter deflection dependent upon the value of plate current in the oscillator tube $V_1$. If the magnitude of the signal being measured is small, it is to be appreciated that the meter M is operating at the lower end of the scale and accordingly, the shunting effect of the diode $V_4$ will be negligible.

As the tube $V_1$, $V_2$ ages and/or other variations are introduced, such as changes in battery voltage, it may be necessary to reestablish the zero setting on the indicating meter M. In this situation, with no signal input to the meter M, the position of the pointer of the meter M is observed. Correction for zero setting is accomplished by variations of the inductance element $L_{14}$ such that the strength of oscillations generated by $V_1$ once again produces the standardizing plate current. When once readjusted, the meter M is again conditioned to read field strength.

If, for example, the next meter reading is to be of television channel "13," operating at a signal frequency of 216 megacycles, the ganged switches are left in the position illustrated in Fig. 1, namely on the terminals marked "HB." In this position the high band pass filter 34 is in circuit and properly selects the frequency range of signal input for application to the heterodyne converter 16. For measuring field intensity of television channel "13," the local oscillator is tuned by the condenser $C_{15}$ to approximately 176 megacycles, such that the required intermediate frequency of 40 megacycles is again produced for input to the superregenerative stage 22. Once again the plate current of the tube $V_1$ as measured by the meter M will indicate the field strength.

From the foregoing, it will be appreciated that the field strength meter of the present invention is particularly suited for incorporation into a compact and portable construction, and is capable of yielding highly accurate measurements of field strength over a relatively wide frequency range, comparable to the television frequency bands which are from 55 megacycles to 900 megacycles. Logarithmic presentation of the signal strength allows for accurate reading without crowding on the meter scales, as clearly seen in Fig. 2. Further, the readily adjustable "zero balance" system allows for meter adjustment to take into account ageing of the tube and/or changes in component values, including the energizing potentials.

In respect to selection of particular frequency ranges, it is to be observed that infrequent adjustments are needed in that an entire range of frequencies including many television channels may be measured with the switch in but a single position. Stated differently, a relatively wide band of frequencies may be accommodated on the meter with but a single switch setting, and the field strength for various channels located within the band accurately determined, with ease, extreme reliability and accuracy.

Numerous modifications of the present invention will occur to those skilled in the art, and accordingly the appended claims should be given a latitude of interpretation consistent with the disclosure and at times certain features of the invention will be used without a corresponding use of other features.

What I claim is:

1. A field intensity indicator for radio frequency signals comprising a mixer having input and output circuits, means for applying said radio frequency signals to said input circuit, an oscillator connected to said mixer and coacting therewith to produce an intermediate frequency signal in said output circuit having a magnitude dependent on the amplitude of said radio frequency signals, a superregenerative circuit including a regenerator tube and feedback means for effecting periodic self quenching of said regenerator tube in response to current flow of said regenerator tube, a bridge circuit including said superregenerative circuit as one arm thereof, and a null indicator for indicating the state of balance of said bridge circuit.

2. A field intensity indicator for radio frequency signals comprising a mixer, means for applying said radio frequency signals to said mixer, an oscillator connected to said mixer for heterodyning said radio frequency signals and providing intermediate frequency signals having a magnitude dependent on the amplitude of said radio frequency signals, a superregenerative circuit arranged to operate in the self-quenching logarithmic mode and including a regenerator tube, a bridge circuit including said superregenerative circuit as one balancing arm thereof, and a null indicator for indicating the state of balance of said bridge circuit.

3. A field intensity indicator for radio frequency signals comprising a mixer having input and output circuits, means for applying said radio frequency signals to said input circuit, an oscillator connected to said mixer and effective therewith to provide intermediate frequency signals in said output circuit having a magnitude dependent on the amplitude of said radio frequency signals, a superregenerative circuit operating on the logarithmic mode including a regenerator tube, a bridge circuit including said regenerative circuit as one balancing arm thereof, a null indicator for indicating the state of balance of said bridge circuit, and means for selectively shunting said null indicator in dependence upon current flow in said regenerator tube.

4. A field intensity indicator according to claim 3 wherein the selective shunting means includes a crystal diode connected in parallel with said null indicator.

5. A battery-operated field intensity indicator for radio frequency signals comprising a mixer having input and output circuits, means for applying said radio frequency signals to said input circuit, an oscillator connected to said mixer and providing intermediate frequency signals in said output circuit having a magnitude dependent on the amplitude of said radio frequency signals, a superregenerative circuit including a regenerator tube and means for effecting periodic self-quenching of said regenerator tube in response to current flow of said regenerator tube, a bridge circuit having null points and including siad superregenerative circuit as one arm thereof, a meter connected across the null points of said bridge circuit and arranged to measure the value of current flow of said regenerator tube, and means for selectively shunting said meter as a function of current flow through said meter.

6. A battery-operated field intensity meter according to claim 5, wherein the selective shunting means includes a first resistance element in series with said meter across said null points, and a crystal diode and second resistance element connected in series with each other across said null points.

7. A meter for measuring field strength over a broad range of frequencies comprising a selection circuit having band pass means for dividing said broad range of frequencies into plural bands each of a prescribed band width, a tunable heterodyne converter deriving its input from said band pass means and producing at its output an intermediate frequency signal of a magnitude dependent upon the strength of input signal to said selection circuit, said converter including a single oscillator circuit arranged to produce a fundamental frequency and harmonic frequencies and tunable to produce said intermediate frequency signal, a self-quenching superregenerative amplifier deriving its input from said converter and having parameters proportioned and arranged to produce an amplified output as a function of the logarithm of the input signal amplitude, and indicating means for said amplified output including a bridge circuit having said superregenerative amplifier as one balancing arm, a null indicator for said bridge circuit, and means for varying the amplified output of said superregenerative amplifier whereby said null indicator may be set for a zero reading in the absence of input signal.

8. A battery-operated meter for measuring field strength over a broad range of frequencies comprising a selection circuit having band pass means for dividing said broad range of frequencies into plural bands each of a prescribed width, a tunable heterodyne converter deriving its input from said band pass means and producing at its output an intermediate frequency signal of a magnitude dependent upon the strength of input signal to said selection circuit, said converter including a single oscillator circuit arranged to produce a fundamental frequency and harmonic frequencies and tunable to produce said intermediate frequency signal, a superregenerative vacuum tube amplifier deriving its input from said converter and having circuit parameters proportioned and arranged to produce a plate current proportional to the logarithm of the input signal amplitude, and means for measuring said plate current including a bridge circuit having said superregenerative amplifier as one balancing arm, a meter connected across the null points of said bridge circuit, and means for varying the plate current of said superregenerative amplifier in the absence of input signal whereby said meter may be set for a zero reading by varying the efficiency of the superregenerative circuit.

9. A battery-operated meter for measuring field strength according to claim 7 including means for stabilizing the plate voltage to the vacuum tube of said superregenerative amplifier.

10. A meter for measuring field strength over a broad range of frequencies comprising a selection circuit having band pass means for dividing said broad range of frequencies into plural bands each of a prescribed width, a tunable heterodyne converter deriving its input from said band pass means and producing at its output an intermediate frequency signal of a magnitude dependent upon the strength of input signal to said selection circuit, said converter including a single oscillator circuit arranged to produce a fundamental frequency and harmonic frequencies and tunable to produce said intermediate frequency signal, a self-quenching superregenerative amplifier deriving its input from said converter and having parameters proportioned and arranged to produce an amplified current output proportional to the logarithm of the input signal amplitude, and measuring means for said amplified current output including a bridge circuit having said superregenerative amplifier as one balancing arm, a meter for said bridge circuit, means for varying the amplified current output of said superregenerative amplifier whereby said meter may be set for a zero reading in the absence of input signal by varying the efficiency of the superregenerative amplifier, and means including a crystal diode for selectively shunting said meter as a function of said amplified current output.

11. A field intensity indicator for radio frequency signal comprising a mixer having input and output circuits, means for applying said radio frequency signals to said input circuit, an oscillator connected to said mixer and coacting therewith to produce an intermediate frequency signal in said output circuit having a magnitude dependent on the amplitude of said radio frequency signals, a superregenerative circuit including a tube having a grid-plate circuit, feed back means in said grid-plate circuit for effecting oscillation of said tube in response to plate current flow, means for varying the efficiency of said feed back means as a control over the magnitude of oscillations produced by said tube to provide a reference plate current with no signal, a bridge circuit including said superregenerative circuit as one arm thereof, and an indicator for indicating the magnitude of unbalance of said bridge circuit in the presence of radio frequency signal input.

12. A field intensity indicator for radio frequency signal comprising a mixer having input and output circuits, means for applying said radio frequency signals to said input circuit, an oscillator connected to said mixer and coacting therewith to produce an intermediate frequency signal in said output circuit having a magnitude dependent on the amplitude of said radio frequency signals, a superregenerative circuit including a regenerator tube having a grid-plate circuit, feedback means in said grid-plate circuit for effecting periodic self quenching of said regenerator tube, means including a variable inductance for varying the efficiency of said feedback means as a control over the magnitude of oscillation produced by said regenerator tube, a bridge circuit including said superregneerative circuit as one arm theerof, and a null indicator for indicating the state of balance of said bridge circuit.

13. A field intensity indicator for radio frequency signals comprising a mixer having input and output circuits, means for applying said radio frequency signals to said input circuit, an oscillator connected to said mixer and coacting therewith to produce an intermediate frequency signal in said output circuit having a magnitude dependent on the amplitude of said radio frequency signals, a superregenerative circuit connected to said output circuit and including a regenerator tube arranged to amplify said intermediate frequency signal and to produce a plate current having a magnitude dependent upon the magnitude of said intermediate frequency signal, a bridge circuit including said superregenerative circuit as one arm thereof, and a null indicator for indicating the state of balance of said bridge circuit.

14. A field intensity indicator for radio frequency signals comprising a mixer having input and output circuits, means for applying said radio frequency signals to said input circuit, an oscillator connected to said mixer and effective therewith to provide intermediate frequency signals in said output circuit having a magnitude dependent on the amplitude of said radio frequency signals, a superregenerative circuit including a regenerator tube, a bridge circuit including said regenerative circuit as one balancing arm thereof, a null indicator for indicating the state of balance of said bridge circuit, and means for selectively shunting said null indicator in dependence upon current flow in said regenerator tube.

15. A meter for measuring field strength over a broad range of frequencies comprising an antenna, a tunable heterodyne converter deriving its input from said antenna and producing at its output an intermediate frequency signal of a magnitude dependent upon the strength of input signal to said antenna, said converter being arranged to produce a fundamental frequency and harmonic frequencies and being tunable to produce said intermediate frequency signal, a superregenerative amplifier deriving its input from said converter and having parameters proportioned and arranged to produce an amplified output as a function of the logarithm of the input signal amplitude, and indicating means for said amplified output including a bridge circuit having said superreegnerative amplifier as one balancing arm, a null indicator for said bridge circuit, and means for varying the amplified output of said superregenerative amplifier whereby said null indicator may be set for a zero reading in the absence of input signal.

16. A meter for measuring field strength over a broad range of frequencies comprising a selection circuit having band pass means for dividing said broad range of frequencies into plural bands each of a prescribed width, a tunable heterodyne converter deriving its input from said band pass means and producing at its output an intermediate frequency signal of a magnitude dependent upon the strength of input signal to said selection circuit, said converter including an oscillator arranged to produce a fundamental frequency and harmonic frequencies and tunable to produce said intermediate frequency signal, a superregenerative amplifier deriving its input from said converter and arranged to produce an amplified current output proportional to its input signal amplitude, and measuring means for said amplified current output including a bridge circuit having said superregenerative amplifier as one balancing arm, a meter for said bridge circuit, means for varying the amplified current output of said superregenerative amplifier whereby said meter may be set for a zero reading in the absence of input signal by varying the efficiency of the superregenerative amplifier, and means for selectively shunting said meter as a function of said amplified current output.

17. A field intensity indicator for radio frequency signals comprising a mixer having input and output circuits, means for applying said radio frequency signals to said input circuit, an oscillator connected to said mixer and coacting therewith to produce an intermediate frequency signal in said output circuit having a magnitude dependent on the amplitude of said radio frequency signals, a superregenerative circuit including regenerator means and feed back means for effecting periodic self quenching of said regenerator means in response to current flow in said regenerator means, a bridge circuit including said superregenerative circuit as one arm thereof, and a null indicator for indicating the state of balance of said bridge circuit.

18. A field intensity indicator for radio frequency signals comprising a mixer, means for applying said radio frequency signals to said mixer, an oscillator connected to said mixer for heterodyning said radio frequency signals and providing intermediate frequency signals having a magnitude dependent on the amplitude of said radio frequency signals, a superregenerative circuit arranged to operate in the self-quenching logarithmic mode and including regenerator means, a bridge circuit including said superregenerative circuit as one balancing arm thereof, and a null indicator for indicating the state of balance of said bridge circuit.

19. A field intensity indicator for radio frequency signals comprising a mixer having input and output circuits, means for applying said radio frequency signals to said input circuit, an oscillator connected to said mixer and effective therewith to provide intermediate frequency signals in said output circuit having a magnitude dependent on the amplitude of said radio frequency signals, a superregenerative circuit operating in the logarithmic mode including regenerator means, a bridge circuit including said regenerative circuit as one balancing arm thereof, a null indicator for indicating the state of balance of said bridge circuit, and means for selectively shunting said null indicator in dependence upon current flow in said regenerator means.

20. A battery-operated field intensity indicator for radio frequency signals comprising a mixer having input and output circuits, means for applying said radio frequency signals to said input circuit, an oscillator connected to said mixer and providing intermediate frequency signals in said output circuit having a magnitude dependent on the amplitude of said radio frequency signals, a superregenerative circuit including regenerator means and means for effecting periodic self-quenching of said regenerator means in response to current flow in said regenerator means, a bridge circuit having null points and including said superregenerative circuit as one arm thereof, a meter connected across the null points of said bridge circuit and arranged to measure the value of current flow in said regenerator means, and means for selectively shunting said meter as a function of current flow through said meter.

References Cited in the file of this patent

UNITED STATES PATENTS

| | | |
|---|---|---|
| 1,836,934 | Morecroft | Dec. 15, 1931 |
| 2,104,211 | Soller | Jan. 4, 1938 |
| 2,273,090 | Crosby | Feb. 17, 1942 |
| 2,283,919 | Diamond et al. | May 26, 1942 |
| 2,354,086 | MacKay | July 18, 1944 |
| 2,453,160 | Ringer | Nov. 9, 1948 |
| 2,561,128 | Mayberry | July 17, 1951 |
| 2,618,743 | Scherbatskoy | Nov. 18, 1952 |
| 2,644,136 | Mullins | June 30, 1953 |
| 2,650,996 | Jaeschke | Sept. 1, 1953 |
| 2,700,730 | Prew | Jan. 25, 1955 |
| 2,748,267 | Richman | May 29, 1956 |